(12) United States Patent
Asada

(10) Patent No.: US 8,876,235 B2
(45) Date of Patent: Nov. 4, 2014

(54) CONTROL SYSTEM, CONTROL DEVICE, AND METHOD OF CONTROLLING A CONTROL DEVICE

(75) Inventor: Kenji Asada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 13/431,120

(22) Filed: Mar. 27, 2012

(65) Prior Publication Data

US 2012/0249626 A1    Oct. 4, 2012

(30) Foreign Application Priority Data

Mar. 30, 2011    (JP) .................... 2011-074399

(51) Int. Cl.
  *B41J 29/38*    (2006.01)
  *G06Q 30/04*    (2012.01)
  *B41J 2/175*    (2006.01)

(52) U.S. Cl.
  CPC ............. *G06Q 30/04* (2013.01); *B41J 2/17546* (2013.01)
  USPC .......................................................... 347/5

(58) Field of Classification Search
  None
  See application file for complete search history.

(56) References Cited

U.S. PATENT DOCUMENTS

| | | | |
|---|---|---|---|
| 6,655,779 B2 | 12/2003 | Usui et al. | |
| 7,216,111 B2 | 5/2007 | Horii et al. | |
| 7,373,305 B2 | 5/2008 | Horii et al. | |
| 7,950,766 B2 | 5/2011 | Ejiri et al. | |
| 2007/0097161 A1* | 5/2007 | Ejiri et al. | 347/5 |
| 2010/0253718 A1* | 10/2010 | Asauchi | 347/7 |

FOREIGN PATENT DOCUMENTS

| | | |
|---|---|---|
| JP | 2002-036582 A | 2/2002 |
| JP | 2002-225307 A | 8/2002 |
| JP | 2003-154734 A | 5/2003 |
| JP | 2004-240756 A | 8/2004 |
| JP | 2004-240836 A | 8/2004 |
| JP | 2007-160848 A | 6/2007 |
| JP | 2009-208440 A | 9/2009 |

* cited by examiner

*Primary Examiner* — Geoffrey Mruk
*Assistant Examiner* — Bradley Thies

(57) ABSTRACT

The possibility of information acquired from a recording device not being correct can be detected. A management server 20 has an information reader 63 that reads related information stored in nonvolatile memory 74 of an ink cartridge 13, an information acquisition unit 62 that acquires related information by communication from a coupon printer CP, and a information comparison unit 64 that compares the related information read by the information reader 63 with the related information acquired by the information acquisition unit 62.

13 Claims, 5 Drawing Sheets

US 8,876,235 B2

CONTROL SYSTEM, CONTROL DEVICE, AND METHOD OF CONTROLLING A CONTROL DEVICE

CROSS-REFERENCE TO RELATED APPLICATION

This application claims priority under 35 U.S.C. §119 to Japanese Patent Application No. 2011-074399 filed on Mar. 30, 2011, the entire disclosure of which is expressly incorporated by reference herein.

BACKGROUND

1. Technical Field

The present invention relates to a control system including a control device and a recording device that uses an ink cartridge with a memory unit, to a control device, and to a method of controlling the control device.

2. Related Art

Systems that bill for the ink used in ink cartridges used by a printer are known from the literature. See, for example, Japanese Unexamined Patent Appl. Pub. JP-A-2002-36582.

The printer is connected over a network to a bill processing device that runs a billing (invoicing) process in the system taught in JP-A-2002-36582, and the printer appropriately outputs information required by the billing process to the bill processing device.

A problem with systems that perform a particular process based on information acquired from a printer, such as in a system that issues invoices based on information input from a printer, is that invoices could possibly be issued based on erroneous information when, for example, the content of the acquired information was changed as a result of an error, or when the content was tampered with and the content changed.

SUMMARY

The invention enables preventing issuing invoices based on wrong information by enabling detecting if there is a possibility that information acquired from a recording device is not the correct information.

One aspect of the invention is a control system including a recording device and a control device. The recording device has an ink cartridge holder in which an ink cartridge with a memory unit can be installed; a recording head that records by depositing ink supplied from the ink cartridge on a recording medium; and an information writing unit that stores related information, which is information related at least to recording, and writes to the memory unit of the ink cartridge. The control device has an information reading unit that reads the related information from the memory unit of the ink cartridge; an information acquisition unit that can communicate with the recording device and acquires the related information in the information writing unit of the recording device; and an information comparison unit that compares the related information read by the information reading unit and the related information acquired by the information acquisition unit.

The related information read from the memory unit of the ink cartridge, and the related information acquired from the recording device, only differ in the path whereby they are acquired by the control device, and their content should therefore match. If this information does not match, one of the values can be concluded to not be correct because of an error or tampering.

By comparing the related information read from the memory unit of the ink cartridge and the related information acquired from the recording device by communication, the possibility that the related information acquired from the ink cartridge or the recording device contains incorrect information can be detected.

In a control system according to another aspect of the invention, the recording device has an ink consumption detection unit that detects at least the ink consumed by recording on the recording medium by the recording head; the information writing unit of the recording device stores information denoting the ink consumption detected by the ink consumption detection unit as the related information, and writes to the memory unit of the ink cartridge; the information reading unit of the control device reads the information denoting ink consumption stored in the memory unit of the ink cartridge; the information acquisition unit of the control device acquires the information denoting ink consumption stored in the information writing unit of the recording device; and the information comparison unit of the control device compares the information denoting ink consumption read by the information reading unit with the information denoting ink consumption acquired by the information acquisition unit.

This aspect of the invention enables detecting the possibility that the acquired information denoting ink consumption is not correct.

When the control system issues invoices based on information denoting ink consumption, this aspect of the invention enables preventing invoicing based on information indicating incorrect ink consumption, and the invention is therefore particularly effective in such systems.

In a control system according to another aspect of the invention, the recording device has an error information generating unit that generates error information related to an error that occurred; the information writing unit of the recording device stores the error information generated by the error information generating unit as the related information, and writes the error information in the memory unit of the ink cartridge; the information reading unit of the control device reads the error information stored in the memory unit of the ink cartridge; the information acquisition unit of the control device acquires the error information stored in the information writing unit of the recording device; and the information comparison unit of the control device compares the error information read by the information reading unit, and the error information acquired by the information acquisition unit.

This aspect of the invention enables detecting the possibility that the acquired error information is not correct.

Error information enables the control system to reference the ink cartridge history, and is therefore particularly useful. By comparing error information read from the memory unit of the ink cartridge and error information acquired from the recording device by communication, this aspect of the invention can detect if any of the acquired error information is not correct based on the result of the comparison.

In a control system according to another aspect of the invention, the control device has a control unit that generates invoice information based on the related information when the comparison by the information comparison unit determines the information is the same (that the related information read from the memory unit of the ink cartridge, and the related information acquired from the recording device by communication, match).

This aspect of the invention enables quickly knowing the result of comparison by the information comparison unit. Billing information for issuing invoices can also be generated when the related information read from the memory unit of the ink cartridge and the related information acquired from the recording device by communication match. Generating billing information when the information does not match can also be prevented.

In a control system according to another aspect of the invention, the recording device has a detection unit that detects the ink remaining in the ink cartridge, or a computation unit that calculates the ink remaining in the ink cartridge based on an ink volume ejected from the recording head; the information writing unit of the recording device stores ink end information indicating ink depletion as the related information when the detection unit or computation unit determines the remaining ink level is below a specific level, and writes to the memory unit of the ink cartridge; the information reading unit of the control device reads the ink end information stored in the memory unit of the ink cartridge; the information acquisition unit of the control device acquires the ink end information stored in the information writing unit of the recording device; and the information comparison unit of the control device compares the ink end information read by the information reading unit, and the ink end information acquired by the information acquisition unit.

By comparing the ink end information read from the memory unit of the ink cartridge and the ink end information acquired from the recording device by communication, the possibility that the related information acquired from the ink cartridge or the recording device contains incorrect information can be detected.

In a control system according to another aspect of the invention, the control device has a control unit that determines based on the result read by the information reading unit if the ink end information is written to the memory unit, and if the ink end information is written, runs a process based on depletion of ink in the ink cartridge.

The detection unit detects the remaining ink level by, for example, detecting the position of the surface of the ink in the ink cartridge using a photosensor that detects the level at which light passes or does not pass. The calculator can calculate the remaining ink by counting the number of shots when ink is ejected from the recording head for recording, converting the shot count to a volume of ink, and subtracting this converted ink volume from the volume of ink contained in a full ink cartridge. The ink used for non-printing applications, such as flushing, is also considered when counting the remaining ink.

In this aspect of the invention, ink end information indicating the end of ink is written to the memory unit of the ink cartridge if the remaining ink in the ink cartridge is below a certain level. As a result, the control device can quickly and easily detect if an ink cartridge has run out of ink based on whether or not the ink end information is written to the memory unit of the ink cartridge, and when an ink cartridge is out of ink can execute an appropriate process based on knowing the ink cartridge is out of ink.

For example, because the ink left in an ink cartridge that is depleted is substantially constant, the control device can store this value in memory and easily estimate the remaining ink instead of individually calculating or detecting the remaining ink level. The control device can also estimate how much ink was used by subtracting the estimated remaining ink from the ink in a full cartridge.

This aspect of the invention can detect the remaining ink much more easily than when individually detecting the remaining ink level or calculating the remaining ink. Because ink cartridges that have run out of ink are normally collected as spent cartridges, the ink cartridges can be processed uniformly, process efficiency can be improved, and the time required for calculating the remaining ink and ink usage can be shortened by using the ink end information to estimate (calculate) the remaining ink in each ink cartridge and ink usage.

The ink cartridge can also be refilled with ink.

The stored related information can also be read and referenced from an ink cartridge recovered for refilling.

Another aspect of the invention is a control device that is communicatively connected to a recording device that has an ink cartridge holder in which an ink cartridge with a memory unit can be installed, a recording head that records by depositing ink supplied from the ink cartridge on a recording medium, and an information writing unit that stores related information, which is information related at least to recording, and writes to the memory unit of the ink cartridge, the control device including: an information acquisition unit that can communicate with the recording device and acquires the related information in the information writing unit of the recording device; an information reading unit that can communicate with the ink cartridge and reads the related information in the memory unit of the ink cartridge; and an information comparison unit that compares the related information read by the information reading unit and the related information acquired by the information acquisition unit.

By comparing the related information read from the memory unit of the ink cartridge and the related information acquired from the recording device by communication, the control device in this aspect of the invention can detect the possibility that the related information acquired from the ink cartridge or the recording device contains incorrect information.

Another aspect of the invention is a control method of a control device, including steps of: acquiring related information stored in the information writing unit of a that has an ink cartridge holder in which an ink cartridge with a memory unit can be installed, a recording head that records by depositing ink supplied from the ink cartridge on a recording medium, and an information writing unit that stores related information, which is information related at least to recording, and writes to the memory unit of the ink cartridge; reading the related information in the memory unit of the ink cartridge; and comparing the related information read by the information reading unit and the related information acquired by the information acquisition unit.

By comparing the related information read from the memory unit of the ink cartridge and the related information acquired from the recording device by communication, the control method according to another aspect of the invention can detect the possibility that the related information acquired from the ink cartridge or the recording device contains incorrect information.

Another aspect of the invention is storage medium storing a program executed by a control unit for controlling parts of a control device, the program causing the control unit to function as an information acquisition unit that can communicate with a recording device that has an ink cartridge holder in which an ink cartridge with a memory unit can be installed, a recording head that records by depositing ink supplied from the ink cartridge on a recording medium, and an information writing unit that stores related information, which is information related at least to recording, and writes to the memory unit of the ink cartridge, and acquires the related information in the information writing unit of the recording device; an information reading unit that can communicate with the ink cartridge and reads the related information in the memory unit of the ink cartridge; and an information comparison unit that compares the related information read by the information reading unit and the related information acquired by the information acquisition unit.

Because the related information read from the memory unit of the ink cartridge and the related information acquired from the recording device by communication are compared by running this program, the possibility that the related information acquired from the ink cartridge or the recording device contains incorrect information can be detected.

Effect of the Invention

The invention enables detecting when information acquired from a recording device is possibly not correct.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
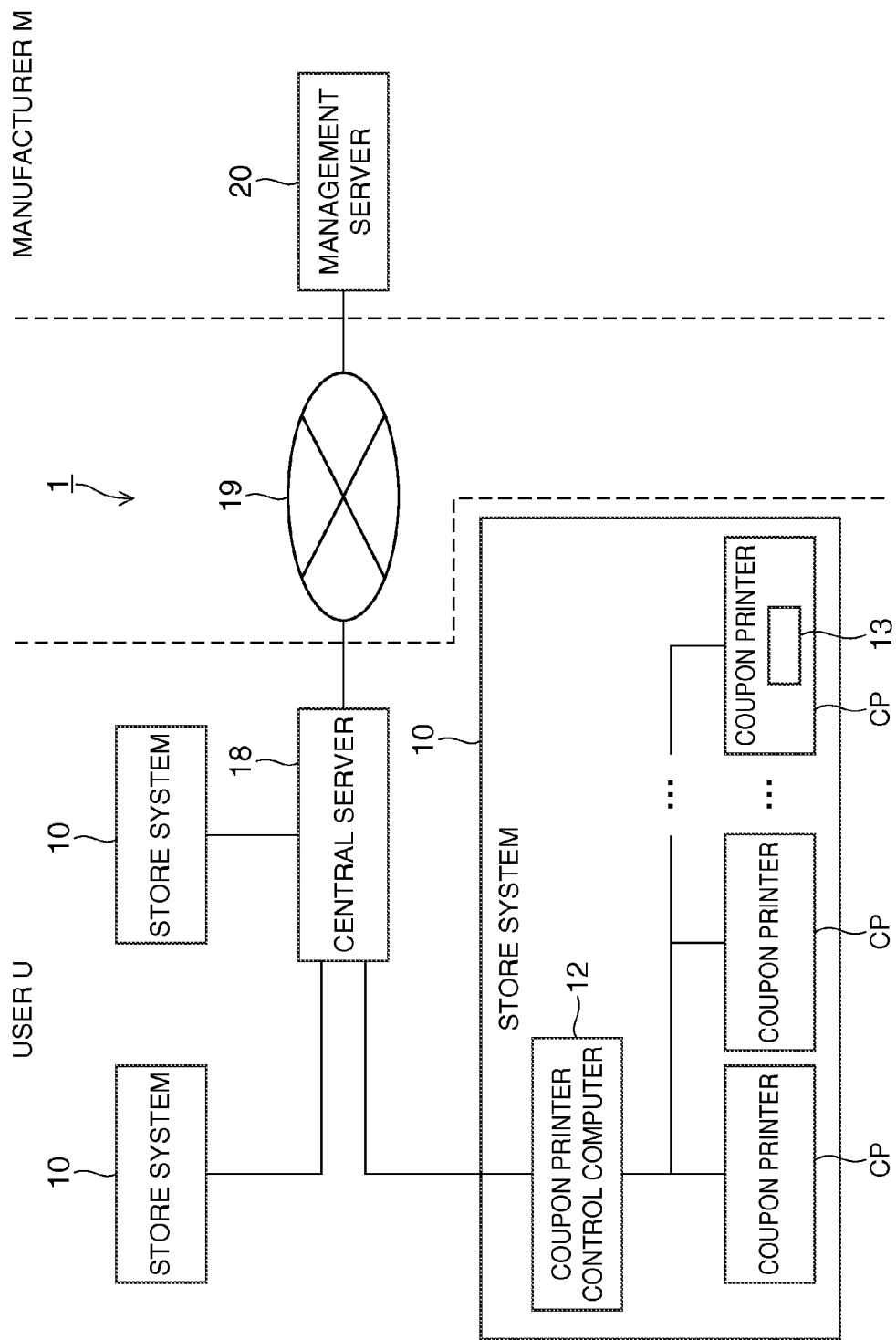
FIG. 1 shows the configuration of a control system.

FIG. 1 is a block diagram showing the configuration of a control system 1 according to this embodiment of the invention.

As shown in FIG. 1, the control system 1 has a store system 10. There could be only one instead of plural store systems 10.

The store system 10 is a system that is deployed in a store such as a supermarket or convenience store, and has at least a function for issuing coupons to customers of the store.

The store system 10 has a plurality of coupon printers CP for printing coupons, and a coupon printer control computer 12 that controls the printers is connected to each coupon printer CP (recording device). There may be only one instead of plural coupon printers CP. The printer CP is an inkjet printer that has an inkjet head 11 (FIG. 2), which is a recording head capable of ejecting ink supplied from an ink cartridge 13 while the recording medium is conveyed in a primary scanning direction, ejects and deposits ink from the inkjet head 11 onto the recording medium, and records color images on the recording medium.

An IC chip 70 is disposed to the ink cartridge 13 that supplies ink to the inkjet head 11, and this IC chip 70 includes nonvolatile memory 74 (FIG. 2) as a memory unit. The detailed configuration of the IC chip 70, and how the IC chip 70 is used, are further described below.

A coupon printer CP is typically installed in a store at each of plural checkout registers in the store, and issues specific coupons at specific times as controlled by the coupon printer control computer 12.

As shown in FIG. 1, plural store systems 10 are connected to a central server 18 in this control system 1. More specifically, the coupon printer control computer 12 of each store system 10 is communicatively connected to a central server 18.

The central server 18 centrally controls the coupon printer control computer 12 installed in each store system 10.

The central server 18 and store system 10 are managed by an entity that runs the store. This entity that runs the store also installs the central server 18 in the corporate headquarters, for example, when constructing the store system 10, and manages the store systems 10 through the central server 18. For convenience below, the entity that runs the store is referred to as the user U.

The central server 18 is connected to a management server 20 (control device) through a network 19 such as the Internet. The central server 18 and management server 20 communicate securely by communication using a specific encryption protocol, communication over a virtual private network, or communication over a dedicated physical line.

The management server 20 is a server that is managed by the manufacturer M, which is an entity that manufactures and sells the ink cartridges 13 filled with ink.

In this embodiment of the invention the manufacturer M provides a service of collecting and recycling spent ink cartridges 13 that were in the store.

The spent ink cartridges 13 are collected by, for example, the userU shipping or mailing the spent ink cartridges 13 to the manufacturer M, a manufacturer M sales representative visiting the store in person at scheduled times or when requested by the user U to collect the ink cartridges 13, or by a third-party systems integrator, for example, collecting the ink cartridges 13.

The collected spent ink cartridges 13 are then disposed of in an environmentally responsible manner, or refilled and reused, in order to more effectively utilize resources and reduce the impact on the environment.

Figure 2:
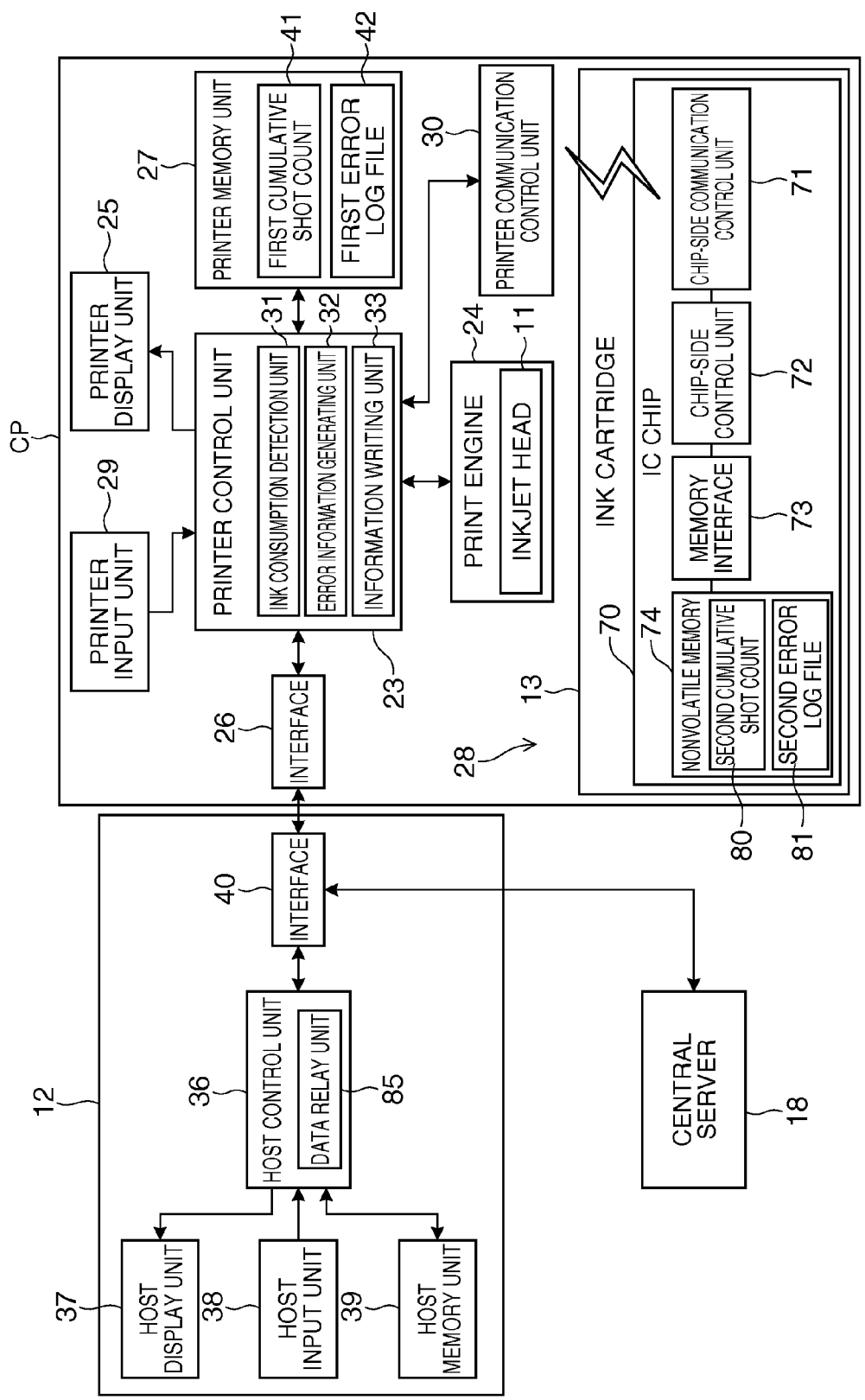
FIG. 2 is a block diagram of a coupon printer and a coupon printer control computer.

FIG. 2 is a block diagram showing the functional configuration of the coupon printer CP and the coupon printer control computer 12 that controls the coupon printer CP.

The coupon printer CP is an inkjet printer, and is capable of performing at least a cleaning operation and flushing operation.

The cleaning operation is an operation that forcibly suctions ink accumulated in the nozzles in order to prevent the viscosity of ink that is left inside the nozzles (not shown in the figure) of the inkjet head 11 (FIG. 2) from increasing over time in order to prevent ink ejection problems caused by viscous ink.

The coupon printer CP has a mechanism that applies negative pressure to the nozzles of the inkjet head 11 to suction ink from inside the nozzles, and performs the flushing operation using this mechanism.

This cleaning operation may be performed automatically by the printer control unit 23, or when triggered by the user U (such as an operator in the store) issuing a cleaning command. When the cleaning operation is performed by a user command, an ink ejection problem has occurred or something suggesting an ejection problem has happened, and the cleaning operation is performed to solve the problem.

The flushing operation is an operation that ejects ink from the nozzles to replace the ink left in the nozzles with fresh ink when ink is not ejected onto the recording medium.

In an inkjet head 11 with numerous nozzles, ink left in the nozzles can dry and increase in viscosity over time, leading to ink ejection problems.

The flushing operation is an operation performed to prevent such ink ejection problems by discharging a specific amount of ink from the nozzles of the inkjet head 11 to replace the ink left in the nozzles with fresh ink.

The flushing operation is performed automatically after moving the inkjet head 11 to the home position HP after the passage of a specific time while recording is in progress, or when other specific conditions are met.

As shown in FIG. 2, the coupon printer CP includes a printer control unit 23, print engine 24, printer display unit 25, printer input unit 29, printer interface 26, printer memory unit 27, and printer communication control unit 30.

The printer control unit 23 centrally controls other parts of the coupon printer CP, and includes a CPU as an operating unit, ROM that nonvolatilely stores the firmware that is executed by the CPU in a computer-readable manner, RAM that temporarily stores the program executed by the CPU and data used in the program, and other peripheral circuits. The printer control unit 23 also has an ink consumption detection unit 31, error information generating unit 32, and information writing unit 33 as further described below.

The print engine 24 produces coupons as controlled by the printer control unit 23 by operating the inkjet head 11, a paper feed motor that drives a paper feed roller that conveys the recording medium, and a carriage drive motor that drives the carriage to make the inkjet head 11 scan in the primary scanning direction and record an image on the recording medium while monitoring output from various sensors.

The printer display unit 25 has an LCD or other type of display panel, and displays information on the display panel as controlled by the printer control unit 23. The printer input unit 29 is connected to switches disposed to the coupon printer CP, detects operation of the switches, and outputs to the printer control unit 23.

The printer-side interface 26 communicates with the coupon printer control computer 12 as controlled by the printer control unit 23 according to a specific communication protocol.

The printer memory unit 27 includes EEPROM or a hard disk drive, for example, and stores data rewritably.

The ink cartridge 13 is installed in an ink cartridge holder 28. An ink inlet for supplying ink to the inkjet head 11 is formed in the ink cartridge holder 28.

The printer communication control unit 30 communicates with the chip-side communication control unit 71 in the IC chip 70 of the ink cartridge 13 by, for example, near-field communication conforming to a specific standard or by communication over a wire connected to a pin of the chip-side communication control unit 71 in the IC chip 70.

When data is transmitted in near-field communication, the printer communication control unit 30 encodes and outputs the transmission data to a modem unit, the modem unit modulates the encoded transmission data and outputs to an RF unit, and the RF unit outputs the modulated transmission data as radio signals over an antenna to the chip-side communication control unit 71. When receiving data, the RF unit outputs the RF signal received from the chip-side communication control unit 71 through the antenna to the modem unit, and the modem unit decodes and outputs the received data based on the signal input from the RF unit to the printer control unit 23.

As described above, ink is supplied from the ink cartridge 13 to the inkjet head 11.

As shown in FIG. 2, an IC chip 70 is disposed to the ink cartridge 13, and the IC chip 70 includes the foregoing chip-side communication control unit 71, a chip-side control unit 72, a memory interface 73, and nonvolatile memory 74 (memory unit).

The chip-side control unit 72 centrally controls other parts of the IC chip 70.

The chip-side communication control unit 71 communicates with the printer communication control unit 30 using the same method as the foregoing printer communication control unit 30 as controlled by the chip-side communication control unit 71 using near-field communication conforming to a specific standard or by communication over a wire connected to a pin of the chip-side communication control unit 71 in the IC chip 70.

The nonvolatile memory 74 has memory devices included in the IC chip 70, and rewritably and nonvolatiley stores data.

The chip-side control unit 72 accesses the nonvolatile memory 74 through the memory interface 73, and can write data to the chip-side communication control unit 71 and read data from the nonvolatile memory 74.

Power is supplied to parts of the IC chip 70 during near-field communication using radio waves for supplying power received from the printer communication control unit 30. Alternatively, a battery could be disposed to the ink cartridge 13 and power could be supplied from the battery.

The printer control unit 23 and chip-side control unit 72 could alternatively communicate by wire in this embodiment.

The IC chip 70 has the nonvolatile memory 74 mounted on a substrate with electrodes for the signal lines of the nonvolatile memory 74 exposed from the substrate. Electrode pins for contact with the electrodes on the nonvolatile memory 74 side are disposed to the printer communication control unit 30, and the nonvolatile memory 74 can be accessed and data read through these electrode pins.

The ink consumption detection unit 31 of the printer control unit 23 is described next.

The ink consumption detection unit 31 counts the cumulative shot count, which is the number of times ink from the ink cartridge 13 is ejected from the inkjet head 11 (the number of shots) after the ink cartridge 13 is installed to the coupon printer CP.

More specifically, the printer memory unit 27 stores a first cumulative shot count 41, which is the total (cumulative shot count) number of times ink is ejected from the ink cartridge 13 from when the ink cartridge 13 is installed to the coupon printer CP to the present. The ink consumption detection unit 31 keeps the cumulative shot count by incrementing the value indicated by the first cumulative shot count 41 for one ink cartridge 13 each time ink in the one ink cartridge 13 is ejected once from one nozzle. For example, when ink from one ink cartridge 13 is ejected 100 times by the inkjet head 11 to record an image to the recording medium, the value indicated by the first cumulative shot count 41 for that one ink cartridge 13 is the sum of the count before the image was recorded plus 100.

The cumulative shot count counted by the ink consumption detection unit 31 in this embodiment of the invention does not include the amount of ink from the ink cartridge 13 filling the path to the inkjet head 11, or the number of shots used in the cleaning operation or flushing operation described above. This is because, as further described below, invoicing is based in this control system 1 on the cumulative shot count that is kept, but ink consumed in the cleaning operation and flushing operation is not deposited on the recording medium, that is, is not used to record an image on the recording medium, and is therefore not used intentionally by the user. As a result, the amount corresponding to the amount of ink used in these operations should not be subject to billing, and therefore should not be included in the cumulative shot count.

The operation of the error information generating unit 32 in the printer control unit 23 is described next.

The error information generating unit 32 generates a first error log file 42 stored in the printer memory unit 27 when an error occurs. The content of this file may be changed as needed.

The first error log file 42 is a file that records errors that occurred in the coupon printer CP in chronological order as text data, and more specifically is a file that stores records including when (date, time) an error occurred, the name of the error, and the content of the error.

Errors include, for example, errors related to the inkjet head 11, carriage, sensors, motors, and other devices and mechanisms; errors related to inkjet head 11 ejection problems, paper conveyance problems, and recording operations; and errors that occur when running software processes, including memory overflow errors and variable assignment errors.

The error information generating unit 32 monitors the occurrence of errors while the coupon printer CP power is on, and when an error is detected, writes a record including the date and time the error occurred, name of the errors, and the error content for that error in the first error log file 42.

The error information generating unit 32 maintains a first error log file 42 for each ink cartridge 13. More specifically, when an ink cartridge 13 is installed, the error information generating unit 32 creates a first error log file 42 for that one ink cartridge 13. The error information generating unit 32 then continues writing error information for each error that occurs to that first error log file 42 until the one ink cartridge 13 is removed and replaced.

The information writing unit 33 is described next.

The information writing unit 33 controls the printer communication control unit 30 to make the chip-side control unit 72 rewrite the content of a second cumulative shot count 80 and second error log file 81 in nonvolatile memory 74.

The second cumulative shot count 80 is cumulative shot count data described above, and the second error log file 81 contains the data from the error log.

The information writing unit 33 rewrites the second cumulative shot count 80 stored in the nonvolatile memory 74 of the IC chip 70 appropriately when the ink consumption detection unit 31 writes the first cumulative shot count 41 in the printer memory unit 27.

The information writing unit 33 also rewrites the second error log file 81 stored in the nonvolatile memory 74 of the IC chip 70 appropriately when the error information generating unit 32 writes information to the first error log file 42 of the printer memory unit 27.

In addition, when the operation whereby the ink cartridge 13 is removed from the coupon printer CP is detected to start, the information writing unit 33 could rewrite the second cumulative shot count 80 and second error log file 81 stored in the nonvolatile memory 74 of the IC chip 70 based on the first cumulative shot count 41 and first error log file 42 in the printer memory unit 27.

More specifically, data can be rewritten by the information writing unit 33 at any time if the value of the second cumulative shot count 80 stored in the nonvolatile memory 74 of the spent ink cartridge 13 is the value indicating the cumulative shot count from the time when the ink cartridge 13 was installed to the coupon printer CP to the time when the ink cartridge 13 was removed, and the content of the second error log file 81 is an error log related to errors that occurred between when the ink cartridge 13 was installed to the coupon printer CP until the ink cartridge 13 was removed, when the ink cartridge 13 is removed from the coupon printer CP as a spent ink cartridge 13. In this case, the first cumulative shot count 41 and the second cumulative shot count 80 are identical, and the first error log file 42 and second error log file 81 are identical, when the ink cartridge 13 is removed from the coupon printer CP.

Note that a real-time clock (RTC) is connected to the printer control unit 23, and the printer control unit 23 can detect the current date and time based on input from the RTC.

As shown in FIG. 2, the coupon printer control computer 12 has a host control unit 36 that controls other parts of the coupon printer control computer 12, a host display unit 37 that displays information on a display panel, a host input unit 38 that detects operation of the input devices and outputs to the host control unit 36, a host memory unit 39 that rewritably stores data, and a host-side communication interface 40 for communicating with the coupon printer CP and central server 18.

When a printer driver for controlling the coupon printer CP is installed to the coupon printer control computer 12 and a coupon is printed, the host control unit 36 generates control commands for performing the operations used to produce a coupon by reading and executing the printer driver, and outputs the control commands to the coupon printer CP.

The printer control unit 23 of the coupon printer CP then controls the print engine based on the input control commands and performs the operations related to producing a coupon.

Figure 3:
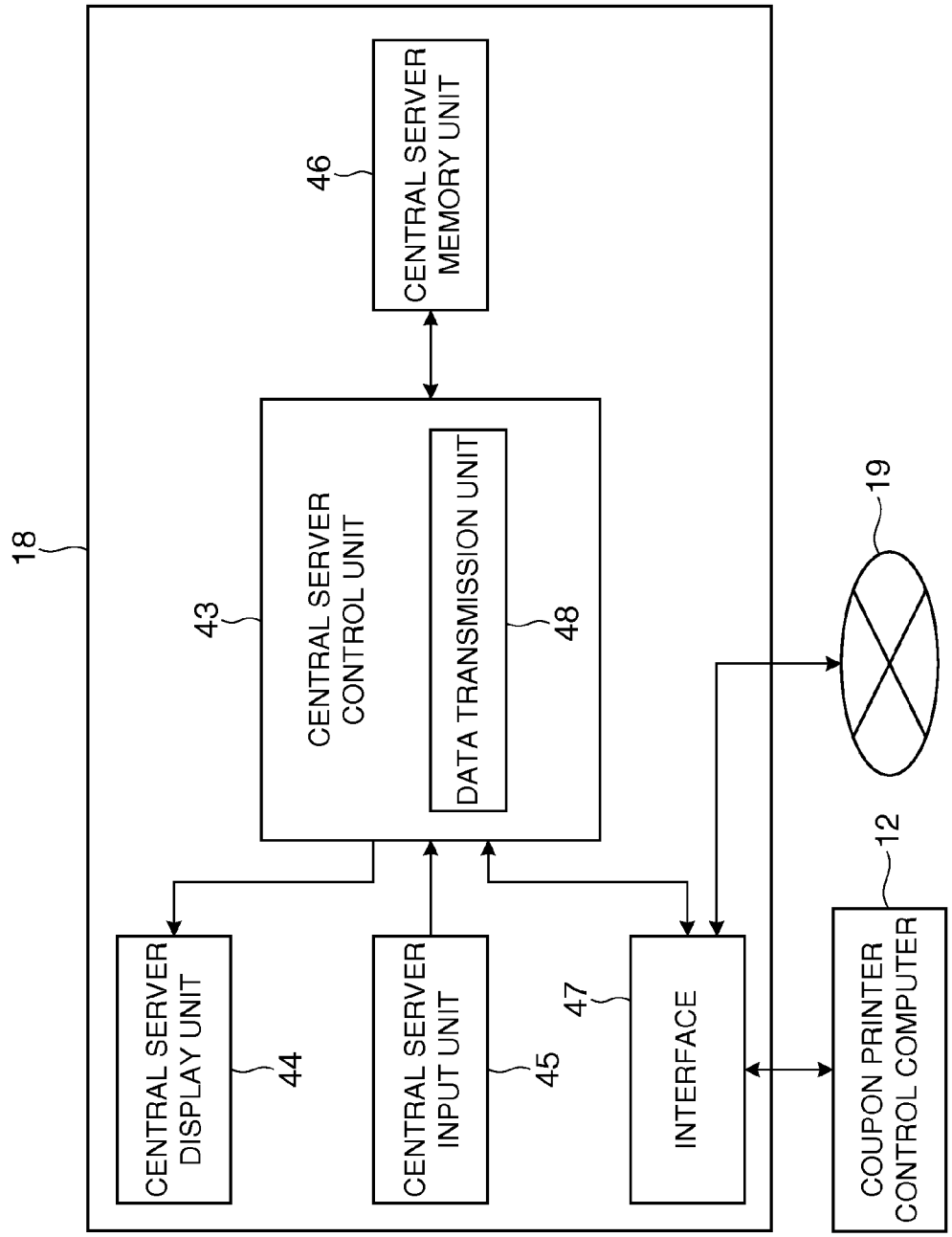
FIG. 3 is a block diagram showing the functional configuration of a central server.

FIG. 3 is a block diagram showing the functional configuration of the central server 18.

As shown in FIG. 3, the central server 18 has a central server control unit 43 that centrally controls other parts of the central server 18, a central server display unit 44 that display information on a display panel, a central server input unit 45 that detects input device operations and outputs to the central server control unit 43, a central server memory unit 46 that rewritably stores data, and a server-side communication interface 47 for communicating with the coupon printer control computer 12.

The data transmission unit 48 of the central server control unit 43 is described below.

Figure 4:
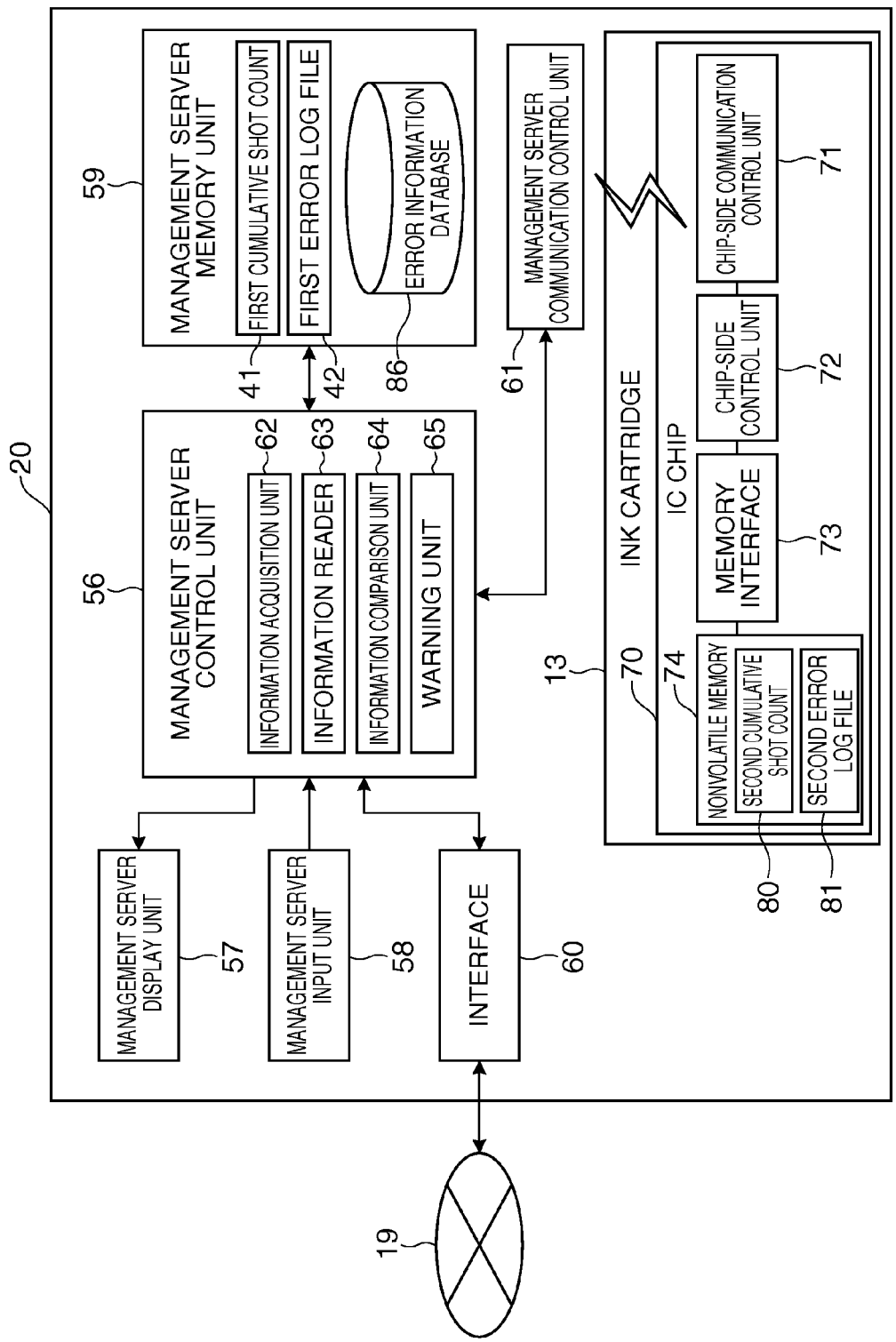
FIG. 4 is a block diagram showing the functional configuration of a management server.

FIG. 4 is a block diagram showing the functional configuration of the management server 20.

As shown in FIG. 4, the management server 20 has a management server control unit 56 that centrally controls parts of the management server 20, a management server display unit 57 that displays information on a display panel, a management server input unit 58 that detects input device operations and outputs to the management server control unit 56, a management server memory unit 59 that stores data rewritably, and a management server-side communication interface 60 for communicating with the central server 18 over the network 19.

The management server communication control unit 61 communicates with the chip-side communication control unit 71 of the ink cartridge 13 as controlled by the management server control unit 56. The method of communication is the same as that of the printer communication control unit 30 described above.

The coupon printer CP could be connected and used instead of the management server communication control unit 61. In this case, a spent ink cartridge 13 that was collected is installed to the coupon printer CP, and data is acquired from the printer communication control unit 30 through the interface 60. The management server control unit 56 includes an information acquisition unit 62, an information reader 63, an information comparison unit 64, and a warning unit 65 as further described below.

The information acquisition unit 62 of the management server control unit 56 is described next together with the data relay unit 85 of the coupon printer control computer 12 and the data transmission unit 48 of the central server 18. The functions of the information acquisition unit 62, data relay unit 85, and data transmission unit 48 are achieved by cooperation between hardware and software, such as by the CPU running a program.

The information acquisition unit 62 gets the first cumulative shot count 41 and first error log file 42 for the one ink cartridge 13 from the coupon printer CP when one ink cartridge 13 is removed from the coupon printer CP.

More specifically, when the printer control unit 23 detects that the ink cartridge 13 will be replaced as a result of input from the printer input unit 29 to replace the ink cartridge 13, the printer control unit 23 informs the data relay unit 85 of the host control unit 36 accordingly. Note that the user operates a particular switch on the coupon printer CP to replace the ink cartridge 13, and the printer control unit 23 determines that the ink cartridge 13 will be replaced when input from this switch is detected.

The data relay unit 85 then controls the printer control unit 23 to send the first cumulative shot count 41 and first error log file 42 stored in the printer memory unit 27 to the data relay unit 85. When the first cumulative shot count 41 and first error log file 42 are received from the printer control unit 23, the data relay unit 85 passes the received data to the data transmission unit 48 of the central server control unit 43 of the central server 18.

The data transmission unit 48 receives the first cumulative shot count 41 and first error log file 42 from the data relay unit 85, and then sends this data through the network 19 to the information acquisition unit 62 of the management server 20.

The information acquisition unit 62 gets the first cumulative shot count 41 and first error log file 42 by receiving them from the data transmission unit 48.

The information acquisition unit 62 then stores the received first cumulative shot count 41 and first error log file 42 in the management server memory unit 59.

Operation of the management server 20 is described next together with the information reader 63, information comparison unit 64, and warning unit 65.

The functions of the information reader 63, information comparison unit 64, and warning unit 65 are achieved by cooperation of hardware and software, such as a CPU running a program.

Figure 5:
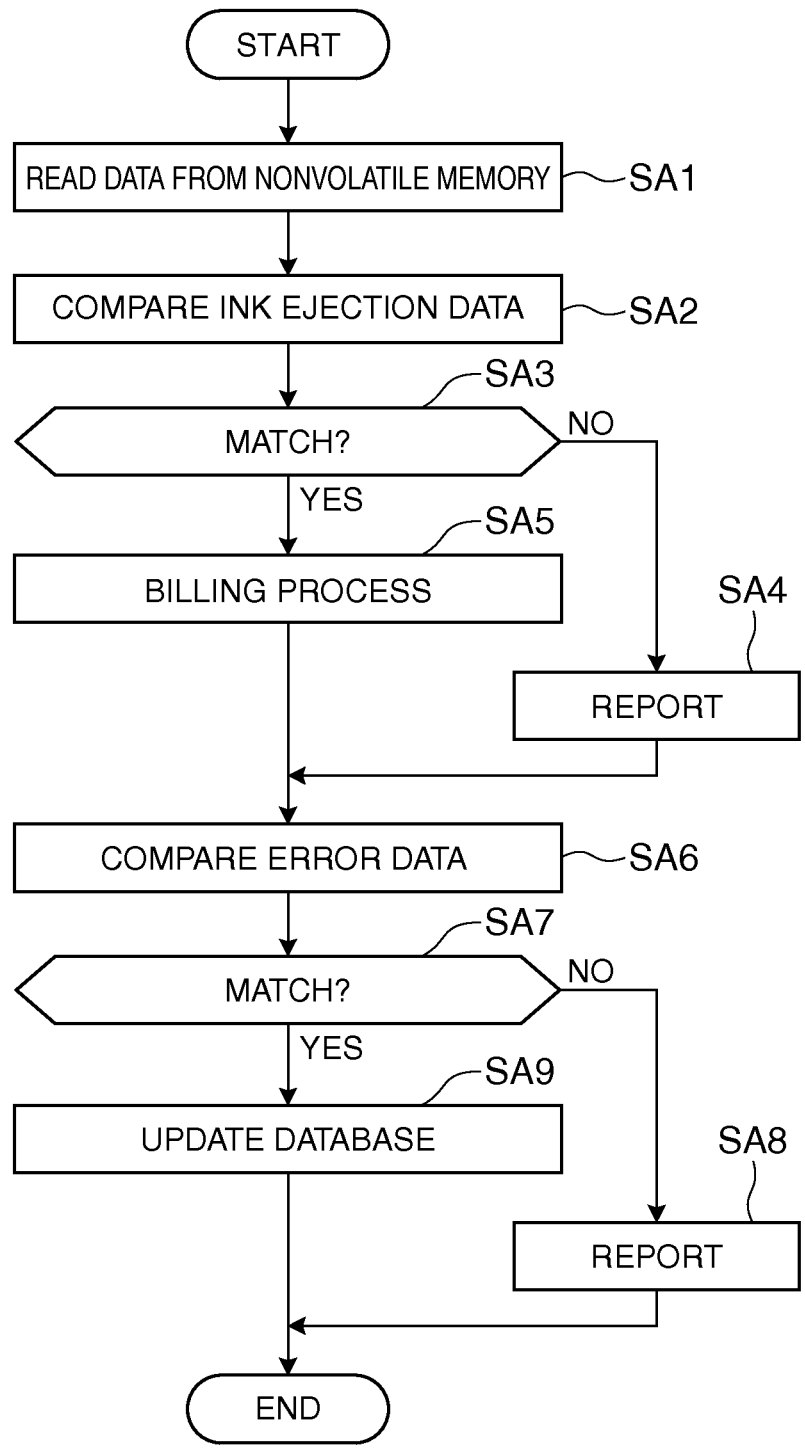
FIG. 5 is a flow chart of management server operation.

FIG. 5 is a flow chart of the operation of the management server 20.

In the operation described below, a ink cartridge 13 is removed from the coupon printer CP for replacement after being used in the coupon printer CP, and after being collected by the manufacturer M is placed in a specific location enabling wireless communication between the management server communication control unit 61 and the chip-side communication control unit 71. The control system 1 according to this embodiment of the invention performs the process described below for each spent ink cartridge 13.

Note, further, that the first cumulative shot count 41 and first error log file 42 are recovered and contain the data related to the ink cartridge 13 set to the specific location. More specifically, the first cumulative shot count 41 and first error log file 42 is the data that is acquired by the information acquisition unit 62 and stored in the management server memory unit 59 when the ink cartridge 13 set in the specific location is removed from the coupon printer CP.

As shown in FIG. 5, the information reader 63 of the management server control unit 56 in the management server 20 controls the management server communication control unit 61 to read the second cumulative shot count 80 and second error log file 81 stored in the nonvolatile memory 74 of the ink cartridge 13 (step SA1).

The information comparison unit 64 of the management server control unit 56 then compares the first cumulative shot count 41 stored in the management server memory unit 59 with the second cumulative shot count 80 read in step SA1 (step SA2). Note that the value denoted by the first cumulative shot count 41 and the value denoted by the second cumulative shot count 80 are compared in step SA2 without considering the data format or differences in data type. More specifically, step SA2 simply determines if the content of the data is the same (whether the data matches or not).

A case in which the value denoted by the first cumulative shot count 41 and the value denoted by the second cumulative shot count 80 differ is considered next.

As described above, the first cumulative shot count 41 and second cumulative shot count 80 are both data denoting the cumulative shot count during the period in which the ink cartridge 13 was installed to the coupon printer CP, and the values denoted by the data should therefore be the same. The values denoted by the data are assumed to differ in the following situations.

First is when the data has been tampered with by a third part when the first cumulative shot count 41 is input through the coupon printer control computer 12, central server 18, and network 19 to the management server 20.

A third party could also access the nonvolatile memory 74 in the IC chip 70 of the ink cartridge 13 and tamper with the data in the process in which the spent ink cartridge 13 is recovered by the manufacturer M.

The first cumulative shot count 41 and/or second cumulative shot count 80 may also not be updated correctly due to a bug in the program that writes data to memory, a temporary write error, an error in the process that manages the cumulative shot count, or other chronic or temporary software or hardware error.

As a result, if the value denoted by the first cumulative shot count 41 and the value denoted by the second cumulative shot count 80 differ, one of the values is determined to be incorrect due to tampering, error, or other cause.

Therefore, if the data content is determined to not match (not be the same) as a result of the information comparison unit 64 comparing the content of the first cumulative shot count 41 and second cumulative shot count 80 (step SA3 returns No), the warning unit 65 of the management server control unit 56 controls the management server display unit 57 and displays an appropriate message on the display panel (step SA4).

The user U can therefore quickly know that either the first cumulative shot count 41 or the second cumulative shot count 80 is incorrect, and can start to determine the cause of the mismatch and resolve the data mismatch.

However, if the first cumulative shot count 41 and second cumulative shot count 80 are determined to match (be the same) (step SA3 returns Yes), the management server control unit 56 runs a billing process to generate invoice information, for example (step SA5).

This billing process calculates the invoice amount based on the cumulative shot count indicated by the first cumulative shot count 41 and second cumulative shot count 80, and issues an invoice, for example.

This embodiment of the invention thus issues an invoice based on the cumulative shot count indicated by the first cumulative shot count 41 and second cumulative shot count 80 only when these counts match. As a result, invoicing based on the cumulative shot count can be reliably prevented when something that creates a mismatch between the first cumulative shot count 41 and second cumulative shot count 80 occurs and the trust level of the cumulative shot count values indicated by the data is low. More particularly, when the cumulative shot count is incorrect, the amount billed to the user U will also be incorrect and the user U may be unfairly disadvantaged, and this can be effectively prevented by the invention.

Returning to FIG. 5, after step SA4 or step SA5, the information comparison unit 64 compares the first error log file 42 stored in the management server memory unit 59 and the second error log file 81 read in step SA1 (step SA6). The content of the first error log file 42 and the content of the second error log file 81 are compared in step SA6 to determine if the content of the files is the same without considering the data format, differences in data type, and location of data in the log.

If the result of the comparison by the information comparison unit 64 is that the content of the first error log file 42 and second error log file 81 do not match (step SA7 returns No), the warning unit 65 displays an appropriate message on the display panel to warn the user (step SA8). As a result, the user U can quickly know that the first error log file 42 and the second error log file 81 do not match.

However, if the content of the first error log file 42 and the second error log file 81 match (step SA7 returns Yes), the management server control unit 56 updates the error information database 86 stored in the management server memory unit 59 based on the content of these logs.

A configuration that does not run the billing process when the first cumulative shot count 41 and second cumulative shot count 80 match (step SA3 returns Yes), and runs the billing process to generate invoice information, for example, when the content of the first error log file 42 and second error log file 81 matches (step SA7 returns Yes), is also conceivable. Further alternatively, a configuration that runs the billing process when either the counts match or the log files match is also conceivable.

The error information database 86 is a database that manages errors that occur for each model of printer provided by the manufacturer M, including the coupon printer CP.

For example, the error information database 86 stores the tendency for errors to occur, the frequency of specific errors, information showing a relationship between one error and another error, and other error-related information, for each printer model.

The error information database 86 is used as valuable information by the manufacturer M to analyze the tendency for errors in specific printer models sold by the manufacturer M, to address errors that occur, and when developing new printers.

A program including an algorithm related to a process for updating the error information database 86 based on an input log file so that the content of that one log file is appropriately reflected in the error information database 86 is stored on the management server 20, and the management server 20 updates the error information database 86 by running this program.

As described above, the error information database 86 is valuable information used to analyze the tendency for errors in specific printer models sold by the manufacturer M, to address errors that occur, and when developing new printers. A certain level of accuracy is therefore required for the first error log file 42 and second error log file 81 used as the source data for updating the error information database 86.

The error information database 86 is therefore updated based on the content of the first error log file 42 and second error log file 81 only when the log file contents match. Updating the error information database 86 can therefore be reliably prevented when something that creates a mismatch between the first error log file 42 and second error log file 81 occurs and the trust level of the file contents is low.

As described above, the management server 20 according to this embodiment of the invention has an information reader 63 that reads the second cumulative shot count 80 and the second error log file 81 (related information) stored in the nonvolatile memory 74 of the ink cartridge 13; an information acquisition unit 62 that acquires the first cumulative shot count 41 and the first error log file 42 (related information) from the coupon printer CP by communication with the coupon printer CP; and an information comparison unit 64 that compares the data read by the information reader 63 with the data acquired by the information acquisition unit 62.

As a result, if any of the data used for comparison is not correct, the possibility that incorrect information is contained in the acquired data can be detected based on the result of the comparison by the information comparison unit 64 because the comparison will detect a data mismatch.

In this embodiment of the invention the information comparison unit 64 compares the first cumulative shot count 41 (information indicating ink consumption) and the second cumulative shot count 80 (information indicating ink consumption). Only if the first cumulative shot count 41 and the second cumulative shot count 80 match does this embodiment generate an invoice based on the cumulative shot count indicated by this data.

As a result, invoicing based on the cumulative shot count can be reliably prevented when something that creates a mismatch between the first cumulative shot count 41 and second cumulative shot count 80 occurs and the trust level of the cumulative shot count values indicated by the data is low. More particularly, when the cumulative shot count is incorrect, the amount billed to the user U will also be incorrect and the user U may be unfairly disadvantaged, and this can be effectively prevented by the invention.

The information comparison unit 64 in this embodiment compares the content of the first error log file 42 (error information related to errors that occurred) and the second error log file 81 (error information related to errors that occurred). This embodiment also updates the error information database 86 based on the content of these files only if the contents of the first error log file 42 and the second error log file 81 match.

As a result, updating the error information database 86 can be reliably prevented when something that creates a mismatch between the first error log file 42 and second error log file 81 occurs and the trust level of the file contents is low.

The management server 20 in this embodiment also has a warning unit 65 that reports when the result of comparison by the information comparison unit 64 is that the data is not the same.

The result of comparison by the information comparison unit 64 can therefore be quickly known.

It will be obvious to one with ordinary skill in the related art that the foregoing is one example of the invention, and can be modified and adapted in many ways without departing from the scope of the accompanying claims.

For example, the following functions could also be provided. More specifically, a coupon printer CP that has a detection unit for detecting the remaining ink in the ink cartridge 13, and a calculator for calculating the remaining ink in the ink cartridge 13 based on the amount of ink ejected from the inkjet head 11, is also conceivable.

The detection unit detects the remaining ink level by, for example, detecting the position of the surface of the ink in the ink cartridge 13 using a photosensor that detects the level at which light passes or does not pass. The calculator can calculate the remaining amount of ink by counting the number of shots when ink is ejected from the inkjet head 11 for recording, converting the shot count to a volume of ink, and subtracting this converted ink volume from the volume of ink contained in a full ink cartridge. The amount of ink used for non-printing applications, such as flushing, is also considered when counting the amount of remaining ink.

The information writing unit 33 of the coupon printer CP writes ink end information indicating the depletion of ink in the nonvolatile memory 74 of the ink cartridge 13 when the amount of remaining ink is detected by the detection unit or calculator to be below a specific level. Based on the information read by the information reader 63, the management server 20 determines if the ink end information is written to the nonvolatile memory 74 of the ink cartridge 13, and if the ink end information has been written, runs a process based on the ink cartridge 13 being out of ink.

In this aspect of the invention, ink end information indicating the end of ink is written to the nonvolatile memory 74 of the ink cartridge 13 if the remaining ink level of the ink cartridge 13 is below a certain level. As a result, the management server 20 can quickly and easily detect if an ink cartridge 13 has run out of ink based on whether or not the ink end information is written to the nonvolatile memory 74 of the ink cartridge 13, and when an ink cartridge is out of ink can execute an appropriate process based on knowing the ink cartridge 13 is out of ink.

For example, because the amount of ink left in an ink cartridge 13 that is depleted is substantially constant, the management server 20 can store this value in memory and easily estimate the remaining amount of ink instead of individually calculating or detecting the remaining ink level. The management server 20 can also estimate how much ink was used by subtracting the estimated remaining amount of ink from the amount of ink in a full cartridge.

This aspect of the invention can detect the amount of remaining ink much more easily than when individually detecting the remaining ink level or calculating the amount of remaining ink. Because ink cartridges that have run out of ink are normally collected as spent cartridges, the ink cartridges can be processed uniformly, process efficiency can be improved, and the time required for calculating the amount of remaining ink and ink usage can be shortened by using the ink end information to estimate (calculate) the amount of remaining ink in each ink cartridge and ink usage.

The first cumulative shot count 41, first error log file 42, second cumulative shot count 80, and second error log file 81 are used as related information in the embodiment described above, but the related information is not so limited. More specifically, the related information can be any information that requires examining to determine if the information is correct, can be acquired from a coupon printer CP or other recording device by communication, and can be written to nonvolatile memory 74 in the ink cartridge 13.

In addition, a first error log file 42 and second error log file 81 storing data in a log format are used as examples of error information related to errors that occur in the embodiment described above. However, the error information is not limited to data in a log format, and could be information showing the errors that occurred in a list format, or information denoting the number of occurrences of each error. In other words, the error information can be any information related to errors regardless of the format.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control system including a recording device and a control device, wherein:
    the recording device has
        an ink cartridge holder in which an ink cartridge with a memory unit can be installed,
        a recording head that records by depositing ink supplied from the ink cartridge on a recording medium, and
        an information writing unit that stores related information, which is information related at least to recording, and writes to the memory unit of the ink cartridge; and
    the control device has
        an information reading unit that can communicate with the ink cartridge and reads the related information in the memory unit of the ink cartridge,
        an information acquisition unit that can communicate with the recording device and acquires the related information in the information writing unit of the recording device, and
        an information comparison unit that compares the related information read by the information reading unit and the related information acquired by the information acquisition unit.

2. The recording system described in claim 1, wherein:
    the recording device has an ink consumption detection unit that detects at least the ink consumed by recording on the recording medium by the recording head;
    the information writing unit of the recording device stores information denoting the ink consumption detected by the ink consumption detection unit as the related information, and writes to the memory unit of the ink cartridge;
    the information reading unit of the control device reads the information denoting ink consumption stored in the memory unit of the ink cartridge;
    the information acquisition unit of the control device acquires the information denoting ink consumption stored in the information writing unit of the recording device; and
    the information comparison unit of the control device compares the information denoting ink consumption read by the information reading unit with the information denoting ink consumption acquired by the information acquisition unit.

3. The recording system described in claim 1, wherein:
    the recording device has an error information generating unit that generates error information related to an error that occurred;
    the information writing unit of the recording device stores the error information generated by the error information generating unit as the related information, and writes the error information in the memory unit of the ink cartridge;
    the information reading unit of the control device reads the error information stored in the memory unit of the ink cartridge;
    the information acquisition unit of the control device acquires the error information stored in the information writing unit of the recording device; and
    the information comparison unit of the control device compares the error information read by the information reading unit, and the error information acquired by the information acquisition unit.

4. The recording system described in claim 1, wherein:
the control device has a control unit that generates invoice information based on the related information when the comparison by the information comparison unit determines the information is the same.

5. The recording system described in claim 1, wherein:
the recording device has a detection unit that detects the ink remaining in the ink cartridge, or a computation unit that calculates the ink remaining in the ink cartridge based on an ink volume ejected from the recording head;
the information writing unit of the recording device stores ink end information indicating ink depletion as the related information when the detection unit or computation unit determines the remaining ink level is below a specific level, and writes to the memory unit of the ink cartridge;
the information reading unit of the control device reads the ink end information stored in the memory unit of the ink cartridge;
the information acquisition unit of the control device acquires the ink end information stored in the information writing unit of the recording device; and
the information comparison unit of the control device compares the ink end information read by the information reading unit, and the ink end information acquired by the information acquisition unit.

6. The recording system described in claim 5, wherein:
the control device has a control unit that determines based on the result read by the information reading unit if the ink end information is written to the memory unit, and if the ink end information is written, runs a process based on depletion of ink in the ink cartridge.

7. The recording system described in claim 1, wherein:
the ink cartridge can be refilled with ink.

8. A control device that is communicatively connected to a recording device that has an ink cartridge holder in which an ink cartridge with a memory unit can be installed, a recording head that records by depositing ink supplied from the ink cartridge on a recording medium, and an information writing unit that stores related information, which is information related at least to recording, and writes to the memory unit of the ink cartridge,
the control device comprising:
an information acquisition unit that can communicate with the recording device and acquires the related information in the information writing unit of the recording device;
an information reading unit that can communicate with the ink cartridge and reads the related information in the memory unit of the ink cartridge; and
an information comparison unit that compares the related information read by the information reading unit and the related information acquired by the information acquisition unit.

9. The control device described in claim 8, wherein:
the recording device has an ink consumption detection unit that detects at least the ink consumed by recording on the recording medium by the recording head;
the information writing unit of the recording device stores information denoting the ink consumption detected by the ink consumption detection unit as the related information, and writes to the memory unit of the ink cartridge;
the information reading unit reads the information denoting ink consumption stored in the memory unit of the ink cartridge;
the information acquisition unit acquires the information denoting ink consumption stored in the information writing unit of the recording device; and
the information comparison unit compares the information denoting ink consumption read by the information reading unit with the information denoting ink consumption acquired by the information acquisition unit.

10. The control device described in claim 8, wherein:
the recording device has an error information generating unit that generates error information related to an error that occurred;
the information writing unit of the recording device stores the error information generated by the error information generating unit as the related information, and writes the error information in the memory unit of the ink cartridge;
the information reading unit reads the error information stored in the memory unit of the ink cartridge;
the information acquisition unit acquires the error information stored in the information writing unit of the recording device; and
the information comparison unit compares the error information read by the information reading unit, and the error information acquired by the information acquisition unit.

11. The control device described in claim 8, further comprising:
a control unit that generates invoice information based on the related information when the comparison by the information comparison unit determines the information is the same.

12. The control device described in claim 8, wherein:
the recording device has a detection unit that detects the ink remaining in the ink cartridge, or a computation unit that calculates the ink remaining in the ink cartridge based on an ink volume ejected from the recording head;
the information writing unit of the recording device stores ink end information indicating ink depletion as the related information when the detection unit or computation unit determines the remaining ink level is below a specific level, and writes to the memory unit of the ink cartridge;
the information reading unit reads the ink end information stored in the memory unit of the ink cartridge;
the information acquisition unit acquires the ink end information stored in the information writing unit of the recording device; and
the information comparison unit compares the ink end information read by the information reading unit, and the ink end information acquired by the information acquisition unit.

13. The control device described in claim 12, further comprising:
a control unit that determines based on the result read by the information reading unit if the ink end information is written to the memory unit, and if the ink end information is written, runs a process based on depletion of ink in the ink cartridge.

* * * * *